United States Patent [19]
Orzel

[11] 3,988,967
[45] Nov. 2, 1976

[54] BRAKE BOOSTER WITH HYDRAULIC RATIO CHANGER

[75] Inventor: Edward S. Orzel, Cleveland, Ohio

[73] Assignee: The Weatherhead Company, Cleveland, Ohio

[22] Filed: July 10, 1975

[21] Appl. No.: 594,804

[52] U.S. Cl. .............................. 91/391 R; 91/460; 91/468
[51] Int. Cl.² ......................................... F15B 13/10
[58] Field of Search ............ 91/391 R, 460; 60/587, 60/548, 581, 555

[56] References Cited
UNITED STATES PATENTS

| | | | |
|---|---|---|---|
| 3,818,705 | 6/1974 | Thomas | 60/548 |
| 3,831,491 | 8/1974 | Thomas | 91/391 R |
| 3,838,629 | 10/1974 | Meyers | 91/460 |

*Primary Examiner*—Paul E. Maslousky
*Attorney, Agent, or Firm*—McNenny, Pearne, Gordon, Gail, Dickinson & Schiller

[57] ABSTRACT

A motor vehicle fluid power circuit is provided with a constant displacement pump, a control valve, an open center steering valve, a hydraulic ratio type brake booster, and a ratio override valve. The control valve includes a shuttle piston which controls fluid flow between the pump and the brake booster, between the pump and the steering valve, and between the brake booster working chamber and the downstream side of the steering valve. The brake booster includes a trapped volume chamber in which a larger area input rod moves to provide greater movement of an output rod and power piston assembly.

19 Claims, 3 Drawing Figures

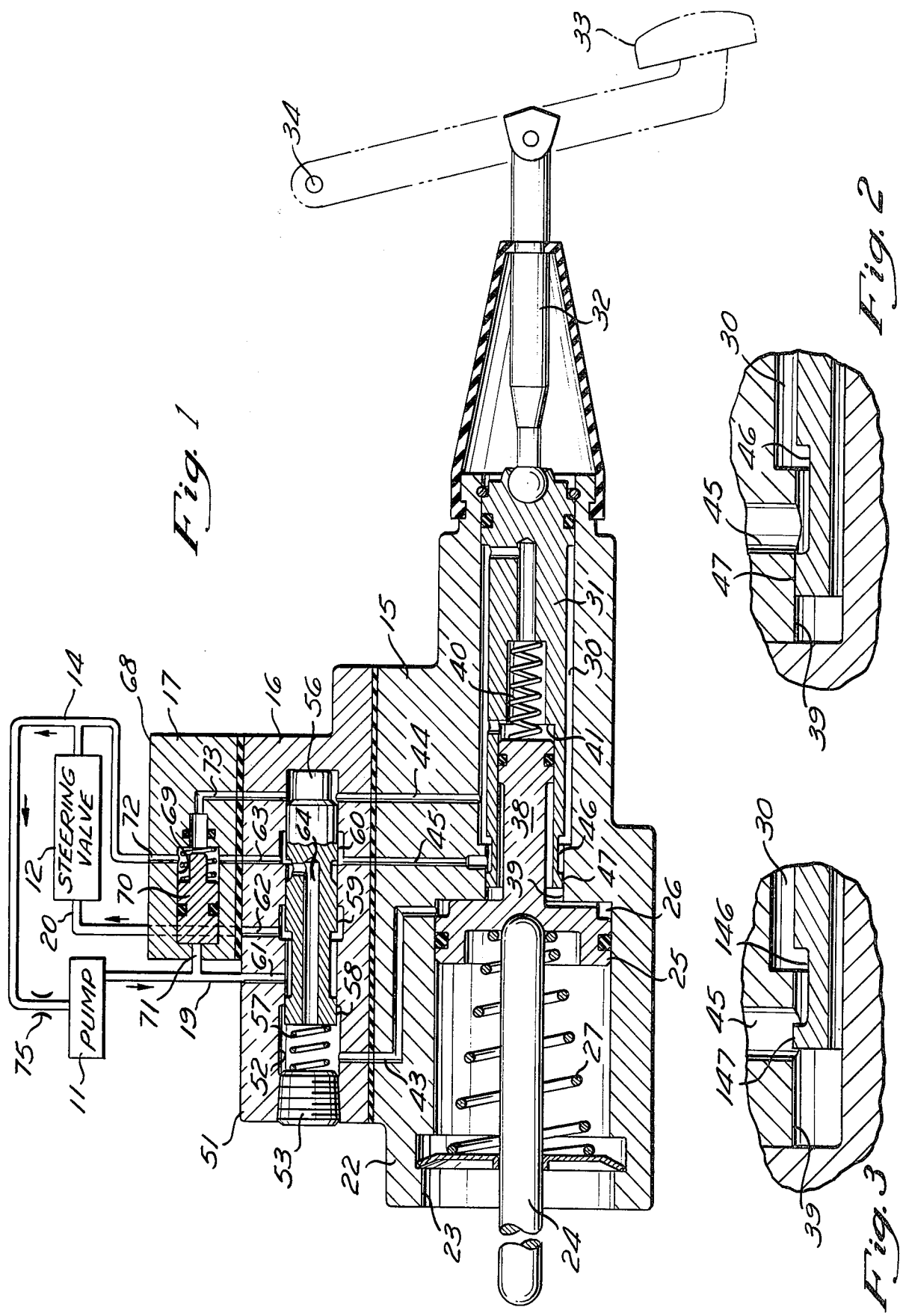

BRAKE BOOSTER WITH HYDRAULIC RATIO CHANGER

BACKGROUND OF THE INVENTION

This invention relates generally to a hydraulic fluid power circuit, and more particularly to a motor vehicle hydraulic fluid power circuit having a hydraulic pump for supplying fluid pressure to assist the operator in steering and breaking the vehicle.

Motor vehicles are frequently provided with a hydraulic pump which is driven by the engine of the vehicle to provide a source of fluid power. In passenger cars, this fluid power is commonly used to assist the operator in steering the vehicle. Because of increasing automobile braking performance requirements and because of a decreasing ability of intake manifold vacuum braking systems to provide that performance, it has been suggested to use the fluid power of the engine driven hydraulic pump to assist the operator in braking the vehicle, as well as to assist the operator in steering the vehicle.

In such motor vehicle fluid power circuits, it is also desirable to provide one ratio of brake pedal movement to master cylinder movement under normal operating conditions and to provide a different ratio in the event of a fluid pressure failure in the system. This is desirable because one such ratio will provide the brake pedal movement and pedal feel characteristics to which drivers are now accustomed with vacuum actuated braking systems, while a different ratio is required to provide high braking pressures with low pedal effort in the event of pump failure.

In order to provide one ratio during normal operation and a second ratio in the event of pump failure, both mechanical and hydraulic ratio change devices have been proposed. Mechanical ratio change brake boosters are shown in U.S Pat Nos. 3,733,966 and 3,733,968. Hydraulic ratio change brake boosters are shown in U.S. Pat. No. 3,793,829 (which provides a ratio change at the outlet end of the brake booster) and in U.S. Pat. Nos. 3,831,491 and 3,838,629 (which provide a ratio change at the inlet end of the brake booster).

SUMMARY OF THE INVENTION

The present invention provides an improvement for hydraulic ratio change brake boosters which: (a) insures full release of the vehicle brakes when the brake pedal is released, (b) minimizes the adverse effects of any air which is present in the hydraulic ratio changer, and (c) prevents premature overriding of the hydraulic ratio changer in the event of a sudden spike brake application.

According to a first feature of the invention, the motor vehicle fluid power circuit includes a pump, a control valve downstream of the pump, a brake booster and a steering valve downstream of the control valve, and a return line carrying fluid from the steering valve and the brake booster back to the pump reservoir. The brake booster includes a trapped volume or constant volume chamber, and an input rod having a relatively large area and an output rod having a relatively small area provide the proper ratio of input rod to output rod movement for normal power actuation of the brake booster. The fluid pressure in the trapped volume chamber acts on one end of the control valve to increase the pressure of the pump by restricting flow to the steering valve and to admit the increased pump pressure to the brake booster working chamber. In order to insure that the pressure in the trapped volume chamber is released when the brake pedal is released, the invention provides a valve carried by the input rod which connects the trapped volume chamber directly to the return line independently of the operation of the control valve. This insures that the trapped volume chamber will return it its deactuated pressure level so that such pressure level does not urge the control valve in a direction to admit pressure to the working chamber of the brake booster when the brake pedal is released. Additionally, in a second embodiment, this valve carried by the input rod also connects the power chamber directly to the return line independently of the control valve to insure full release of the brakes when the brake pedal is deactuated. In this manner, the first feature of applicant's invention insures full release of the brakes even when the control spool might stick, particularly at the low pressures below 100 p.s.i. which are encountered at the end of a brake release stroke.

According to a second feature of the invention, a flow restrictor is placed in the return line upstream of the pump reservoir and downstream of the steering valve and brake booster. The flow restrictor maintains the pressure in the return line at 5 to 8 p.s.i. Because this pressure is communicated directly to the trapped volume chamber by virtue of the first feature of the invention which connects the trapped volume chamber directly to the return line when the brakes are deactuated, a pressure of 5 to 8 p.s.i. is maintained in the trapped volume chamber when the brakes are fully released. This prepressurizes the trapped volume chamber and reduces the volume of any air bubbles that are present in the trapped volume chamber. Then, when the brake pedal is actuated and pressure must build in the trapped volume chamber in order to actuate the brakes of the vehicle, initial movement of the input rod is not wasted due to the compressability of the air bubbles that are present in the trapped volume chamber.

According to a third feature of the invention, a ratio override valve is provided in a passage which leads from the trapped volume chamber to the return line. The ratio override valve is closed under normal operating conditions, but opens in the event of fluid pressure failure in the pump to prevent pressure build up in the trapped volume chamber in order to permit direct mechanical engagement of the brakes with a one to one ratio. The ratio override valve includes a shuttle piston which has a very large cross-sectional area exposed to pump presssure and which has a very small cross-sectional area of approximately one-tenth the large area exposed to pressure in the trapped volume chamber. In this manner, in the event of a spike brake application which produces a sudden momentary spike pressure increase in the trapped volume chamber, such pressure increase acting against the small area of the shuttle piston is not sufficient to overcome the pump pressure acting against the large area of the shuttle piston, so that the ratio override valve remains closed even in the event of a spike pressure increase in the trapped volume chamber.

BRIEF DESCRIPTION OF THE DRAWINGS

These and other features and advantages of the present invention will be more readily apparent to those skilled in the art upon an understanding of the embodiments of the invention shown in the accompanying drawings, wherein:

FIG. 1 is a view of a motor vehicle fluid power circuit according to the principles of the invention, with the brake booster and control valve and ratio override valve shown in cross-section, and with the circuit shown at least partially schematically to simplify the description and assist in understanding the invention;

FIG. 2 is an enlarged cross-sectional view of the end of the input rod of the brake booster shown in FIG. 1; and FIG. 3 is an enlarged cross-sectional view of the end of the input rod modified from that shown in FIG. 2.

DETAILED DESCRIPTION OF THE DRAWINGS

Referring now to the drawings in greater detail, FIG. 1 illustrates a fluid power circuit in a motor vehicle according to the principles of the invention. The circuit includes a constant displacement pump 11 which is driven by the engine of the motor vehicle (not shown), and in the preferred embodiment the pump 11 is a constant displacement pump having an output of 2.5 gallons per minute and is of the type commonly used in motor vehicle power steering systems at the present time.

The circuit shown in FIG. 1 also includes a steering valve 12 which is of the type conventionally used in automobiles at the present time. The steering valve 12 is an open center valve which directs the fluid which it receives back to the pump 11 through a return line 14 when the steering valve 12 is in its neutral or center position. When fluid from the pump 11 is required to assist in the steering of the vehicle and the steering valve 12 is displaced from its center position, the steering valve 12 directs at least some of the fluid received from the pump 11 to assist the operator in steering the vehicle in a well-known manner.

The circuit shown in FIG. 1 also includes a brake booster 15, a control valve 16, and a ratio override valve 17. Although these components of the circuit are shown in FIG. 1 as separate elements bolted together in one unit, the booster 15 and control valve 16 and ratio override valve 17 are interdependent and function in a cooperative manner as explained in detail below. A suitable line 19 carries fluid from the outlet side of the pump 11 to the control valve 16. The brake booster 15 and control valve 16 and ratio override valve 17 are hydraulically connected by suitable conduits or passages in a manner described below. A line 20 carries fluid from the control valve 16 to the steering valve 12 as also described below.

The brake booster 15 includes a cast aluminum housing 22 having a bore 23 extending from end to end therethrough. A master cylinder actuating rod 24 extends axially from a larger diameter portion of the bore 23 and transmits forces between a power piston 25 and a conventional master cylinder (not shown) to actuate and deactuate the hydraulic brakes of the vehicle. The power piston 25 and the larger diameter bore portion 23 cooperatively define a power chamber 26. The power chamber 26 receives pressurized fluid from the pump 11, and the pressurized fluid exerts a hydraulic force against the power piston 25 to move the power piston 25 to the left when the brakes of the vehicle are actuated in a manner described below. A return spring 27 biases the power piston 25 to the right as viewed in FIG. 1 when the brakes of the vehicle are deactuated.

At the right end of the bore 23, a trapped volume or substantially constant volume chamber 30 is provided. An input rod 31 is slidably disposed in the trapped volume chamber 30, and a suitable snap ring at the rightmost end of the bore 23 retains the input rod 31 in the trapped volume chamber 30. A suitable mechanical link 32 mechanically connects the input rod 31 to a brake pedal 33 which is pivotally mounted at a pivot point 34 for actuation by the foot of the operator.

An output rod 38 is also slidably disposed in the trapped volume chamber 30 and is rigidly connected to the power piston 25. The output rod 38 is sealingly carried in an internal bore in the input rod 31, and the left end of the input rod 31 is lap-fit in a center bore portion 39 of the bore 23, so that the trapped volume chamber 30 and the fluid power chamber 26 are hydraulically isolated from one another under all conditions in the embodiment shown in FIG. 1. A spring 40 maintains a preselected spacing between the right end face of the output rod 38 and an abutment surface 41 of the input rod 31 when the brake booster 15 is deactuated.

The input rod 31 has a net lateral cross-sectional area exposed to fluid pressure in the trapped volume chamber 30 which is substantially greater than the net lateral cross-sectional area of the output rod 38 exposed to such pressure. For this reason, if the volume in the trapped volume chamber 30 remains constant, any movement of the input rod 31 to the left will necessitate a movement by the output rod 38 which is greater than such movement of the input rod 31 by a factor which is equal to the ratio of the area of the input rod 31 to the area of the output rod 38, since the fluid in the trapped volume chamber 30 is substantially incompressible.

The brake booster 15 also includes an inlet passage 43 which receives fluid from the pump 11 and control valve 16 to supply such fluid to the power chamber 26. A control and override passage 44 establishes fluid pressure communication between the trapped volume chamber 30 and the control valve 16 and ratio override valve 17 for purposes described below.

A return passage 45 communicates the trapped volume chamber 30 to the return line 14. As further shown in FIG. 1, an annular groove 46 on the left end of the input rod 31 opens fluid pressure communication between the trapped volume chamber 30 and the return passage 45 when the input rod 31 returns to its deactuated position shown in FIG. 1. A land 47 adjacent the groove 46 is lap-fit as mentioned above in the center bore portion 39 to block fluid pressure communication between the trapped volume chamber 30 and the power chamber 26 through the center bore portion 39. The fluid pressure communication between the trapped volume chamber 30 and the return passage 45 established by the groove 46 is terminated upon initial movement of the input rod 31 to the left as viewed in FIGS. 1 and 2 by the outer peripheral surface of the input rod 31 immediately to the right of the groove 46.

As further shown in FIG. 1, the control valve 16 includes a cast iron control valve housing 51 having a machined bore 52 extending from its left end. The left end of the bore 52 is sealingly closed by a suitable plug 53.

A control spool 56 is slidably disposed in the bore 52 and is biased to the right as viewed in FIG. 1 by a light biasing spring 57. The spool 56 includes a first land 58, a second land 59, and a third land 60. The first land 58, in a manner discussed in detail below, controls fluid pressure communication between a pump passage 61 (which is connected to the outlet side of the pump 11 by the line 19) and the inlet passage 43 of the brake booster 15. The second land 59, as also discussed below, controls fluid flow from the pump passage 61 to a steering valve passage 62. The steering valve passage 62 is in open fluid pressure communication with the inlet side of the steering valve 12 through the line 20 and is not hydraulically connected to the ratio override valve 17 as indicated by the dotted lines in FIG. 1. The third land 60, as also discussed below, controls fluid pressure communication between a return passage 63 (which is in open fluid pressure communication with the return line 14) and the power chamber 26 by way of a radial and axial passage 64 in the control spool 56. The entire left end face of the control spool 56 is exposed to the pressure in the power chamber 26 through the inlet passage 43, and the entire right end face of the control spool 56 is exposed to pressure in the trapped volume chamber 30 through the control and override passage 44.

Still referring to FIG. 1, the ratio override valve 17 includes a cast iron override valve housing 68 having a machined stepped bore 69 therein. Although the ratio override valve housing 68 is shown as a separate casting from the control valve housing 51 in the drawings to facilitate explanation, the housings 68 and 51 may alternatively be cast as a single housing. Suitable bolts (not shown) extend through the housings 68 and 51 to secure the housings 68 and 51 to the brake booster housing 22, and suitable seals are provided to prevent fluid leakage between the housings 68, 51 and 22.

A dual diameter override piston 70 is slidably disposed in the bore 69 and is spring biased to the left by a light spring to the position shown in the drawings when the pump 11 is not operating. A suitable seal on the larger diameter portion of the piston 70 sealingly engages the larger diameter portion of the bore 69, and another seal suitably held in the housing 17 provides sealing engagement between the smaller diameter portion of the bore 69 and the smaller diameter portion of the piston 70 when the piston 70 is moved to the right from the at rest position shown in FIG. 1. The housing 68 of the ratio override valve 17 also includes a pump passage 71 connecting the left end of the bore 69 to the outlet side of the pump 11 through the line 19, a return passage 72 connected to the return line 14, and an override passage 73 hydraulically connected to the trapped volume chamber 30 through the passage 44 under all conditions.

A flow restrictor 75, which may be a single restrictive orifice or a plurality of restrictions, is placed in the return line 14 upstream of the atmospheric vented reservoir or inlet side of the pump 11 and is arranged to provide a back pressure of not less than 3 p.s.i. and not greater than 10 p.s.i. gauge pressure, and preferably of 5 to 8 p.s.i. gauge pressure inclusive, at the location at which the booster return passage 45 is connected to the return line 14. Since the pump 11 is a constant displacement pump, this back pressure will exist under all conditions and will exist whether the steering valve 14 is actuated or deactuated. Also, since there is little or no flow between the return passage 45 and the return line 14, the pressure in the return passage 45 under all conditions is maintained at this pressure level.

Turning now to the operation of the circuit shown in FIG. 1, all of the components assume the at rest positions shown in FIG. 1 when the pump 11 is deactuated such as when the engine of the motor vehicle (not shown) which drives the pump 11 is not running and the brake pedal 33 is deactuated. In this position, the piston 70 of the ratio override valve 17 is biased to the left as shown in FIG. 1 by the light biasing spring so that the smaller diameter portion of the piston 70 is separated from the smaller diameter portion of the bore 69. This communicates the trapped volume chamber 30 with the return line 14 through the passage 44. Additionally, under these conditions, the control spool 56 of the control valve 16 is biased to the rightmost position shown in FIG. 1 by the spring 57.

In this at rest or deactuated position, the return spring of the master cylinder of the motor vehicle (not shown) acts against the master cylinder actuating rod 24 in cooperation with the spring 27 to return the power piston 25 to the position shown in the drawings. The spring 40 acting between the right end face of the output rod 38 and the abutment surface 41 of the input rod 31 holds the input rod 31 to the right against the snap ring at the rightmost end of the bore 23. In this position, the groove 46 adjacent the land 47 on the input rod 31 provides open fluid pressure communication between the trapped volume chamber 30 and the return line 14 through the passage 45 completely independently of the movement or position of the control spool 56.

When the pump 11 begins to operate and the steering valve 12 and brake booster 15 are both deactuated, the control spool 56 of the control valve 16 remains in its at rest position shown in FIG. 1. In this position, the first land 58 prevents any flow of fluid from the pump 11 and the pump passage 61 to the inlet passage 43 and the power chamber 26 of the brake booster 15. In this position of the control spool 56, the second land 59 directs the entire output flow from the pump 11 to the steering valve 12 through the steering valve passage 62. The third land 60 of the control spool 56 in this position connects the power chamber 26 to the return line 14 through the passages 64 and 43.

When the pump 11 begins to operate and the steering valve 12 and brake booster 15 are both deactuated, the piston 70 of the ratio override valve 17 moves to the right so that its smaller diameter end portion moves into the smaller diameter portion of the bore 69 to close off communication between the return passage 72 and the ratio override passage 73. This is because, even with the steering valve 12 and brake booster 15 deactuated, the small pressure drop across the second land 59 and across the steering valve 12 provides a sufficient pressure drop across the piston 70 to move the piston 70 against the light bias of its associate spring.

When the steering valve 12 and brake booster 15 are both deactuated and the pump 11 is operating in this manner, the flow restriction 75 maintains the pressure in the return line 14 at the location at which the return passage 45 is connected to the return line 14 at 5 to 8 p.s.i. inclusive as explained above. Because there is little or no flow between the passage 45 and the return line 14, this maintains the trapped volume chamber at 5 to 8 p.s.i. to prepressurize the trapped volume chamber 30 when the brake booster 15 is deactuated.

In the event that any air is present in the trapped volume chamber 30, this pressure compresses the air in the trapped volume chamber 30 to permit a rapid build-up of pressure in the trapped volume chamber 30 when the brake pedal 33 is actuated. This eliminates delay or lost motion of the input rod 31 in building pressure in the trapped volume chamber 30 which would otherwise result from initial compression of such air when the brake booster is actuated by depressing the brake pedal 33. By eliminating this lost motion of the input rod 31, the abutment surface 41 of the input rod 31 is also prevented from contacting the right end face of the output rod 38 during normal operation. This 3 to 10 and preferably 5 to 8 p.s.i. prepressure in the deactuated trapped volume chamber 30 is sufficient to prevent objectionable lag or delay in build-up of pressure in the trapped volume chamber 30 and in the power chamber 26, but is not so great that it provides a strong resistance to initial movement of the input rod 31 or that it causes dragging of the brakes of the vehicle.

When the pump 11 is operating and the brake pedal 33 is pushed to the left to begin to move the input rod 31 to the left, the outer diameter of the input rod 31 immediately to the right of the groove 46 cooperates with the central portion 39 of the bore 23 to close off communication between the trapped volume chamber 30 and the return line 14. At this point, the control spool 56 of the control valve 16 is still in its rightward position shown in FIG. 1, and the piston 70 of the ratio override valve 17 is moved to its rightmost position due to pump pressure.

Further movement of the input rod 31 to the left as viewed in FIG. 1 begins to build pressure in the trapped volume chamber 30. This increased pressure acts on the right end of the control spool 56 and begins to move the control spool 56 to the left against the bias of the light spring 57. As the pressure in the trapped volume chamber 30 continues to increase, the third land 60 first closes fluid communication between the return line 14 and the power chamber 26. The first land 58 then opens restricted communication between the outlet side of the pump 11 and the power chamber 26 through the pump passage 61, and the second land 59 begins to restrict the flow of fluid from the pump 11 to the steering valve 12 to increase the outlet pressure of the pump 11. This increased pump pressure is communicated to the power chamber 26 through the passage 43 to commence moving the power piston 25 to the left.

As the pressure in the trapped volume chamber 30 increases, the force acting to the left on the control spool 56 is the force of the trapped volume pressure acting on the right end face of the control spool 56, while the force acting to the right on the control spool 56 is the sum of the force of the spring 57 plus the force of the power chamber pressure acting against the left end face of the control spool 56. As the brake pedal 33 is pressed harder to build a higher pressure in the trapped volume 30, the shuttle piston 56 therefore moves to the left so that the second land 59 further increases the outlet pressure of the pump 11 and the first land 58 communicates this increased pressure to the power chamber 26. This increased pressure in the power chamber 26 then acts on the left end face of the control spool 56 to balance the control spool 56.

As the brakes are being applied in this manner, any movement of the input rod 31 to the left results in a greater movement of the output rod 38 and power piston 25 to the left. This is because, as mentioned above, the lateral cross-sectional area of the output rod 38 in the trapped volume chamber 30 is less than the effective lateral cross-sectional area of the input rod 31 in the trapped volume chamber 30. In the embodiment shown in the drawings, these areas are arranged so that the axial movement of the output rod 38 and power piston 26 is about 1.7 times the axial movement of the input rod 31.

During this application of the brakes, the brake pedal 33 may be depressed so suddenly as to provide a spike in the pressure in the trapped volume chamber 30. This pressure spike would be a sudden increase and then decrease in pressure resulting from the control spool 56 and output rod 38 not being able to respond instantaneously to a pressure build-up in the trapped volume chamber 30 due to the dynamic characteristics of the system. This spike pressure cannot however open the ratio override valve 17. This is because the lateral cross-sectional area of the larger diameter portion of the ratio override piston 70 exposed to pump pressure is approximately ten times the area of the smaller diameter portion of the piston 70 exposed to trapped volume chamber pressure. Because of this, a pressure in the trapped volume chamber 30 several times larger than the pump pressure will not open the ratio override valve 17 during a spike brake application.

An additional advantage of the dual diameter ratio override piston 70 is that it prevents fall through of the input rod 31 and brake pedal 33 when the pump relief pressure is reached. When the pump relief pressure (which is 1200 p.s.i. in the circuit shown in FIG. 1) is reached, an internal relief valve (not shown) in the pump 11 opens to prevent any further increases in pump pressure. If the operator of the vehicle continues to increase the force on the brake pedal 33 after the pump relief pressure is reached, the pressure in the trapped volume chamber 30 increases while the pump pressure remains constant. This increased trapped volume chamber pressure acting on the smaller diameter portion of the piston 70 is not sufficient to overcome the constant pump relief pressure acting on the larger diameter end of the piston 70 to open the ratio override valve 17, because the area of the larger diameter portion is approximately 10 times the area of the small diameter portion. This prevents the ratio override valve 17 from opening and releasing the pressure in the trapped volume chamber 30 under these conditions and thereby prevents the input rod 31 and brake pedal 33 from moving rapidly to the left until the abutment surface 41 mechanically engages the output rod 38 due to pressure release in the trapped volume chamber 30.

When the brakes of the vehicle have been actuated and the force on the brake pedal 33 is diminished, such force will decrease the pressure in the trapped volume chamber 30. This decreased pressure acting on the right end of the spool 56 permits the pressure in the power chamber 26 to move the control spool 56 to the right. When this occurs, the first land 58 closes communication between the outlet side of the pump 11 and the power chamber 26, and the third land 60 opens restricted fluid pressure communication between the power chamber 26 and the return line 14 to correspondingly decrease the pressure in the power chamber 26.

As mentioned above, it is a pressure differential between the pressure in the power chamber 26 acting on the left end of the spool 56 and the pressure in the trapped volume chamber 30 acting on the right end of the control spool 56 which causes the control spool 56 to shuttle to the left or right in the bore 52. Near the end of a brake release stroke, the pressures in the power chamber 26 and in the trapped volume chamber 30 reach relatively low pressure levels below 100 p.s.i., so that only a relatively small pressure is available to move the control spool 56. If the spool 56 were to stick in its position in which the third land 60 isolates the power chamber 26 from the return line 14 near the end of a brake release, a pressure differential would have to be maintained across the sticking control spool to free it so that the control spool could move to release the pressure in the power chamber 26.

In the embodiment shown in FIGS. 1 and 2, the land 47 at the left end of the input rod 31 maintains hydraulic isolation of the power chamber 26 from the trapped volume chamber 30 when the input rod 31 is fully released in the event the spool 56 sticks in a position in which the third land 60 is closed. Under these conditions, the groove 46 provides a direct connection from the trapped volume chamber 30 to the return line 14 independently of the position of the control spool 56. In this manner, in the embodiment shown in FIGS. 1 and 2, the pressure in the trapped volume chamber 30 is returned to the 5 to 8 p.s.i. pressure level of the return line 14 independently of the control spool 56 to reduce the pressure acting on the right end face of the spool 56. When this occurs, any residual pressure remaining in the power chamber 26 which might cause the brakes of the vehicle to drag will act against the left end of the control spool 56 to free the sticking control spool and return the control spool 56 to the rightmost position shown in FIG. 1 at which the third land 60 hydraulically connects the power chamber 26 to the return line 14. Thus, by hydraulically connecting the trapped volume chamber 30 directly to the return line 14 while maintaining hydraulic isolation between the power chamber 26 and the trapped volume chamber 30, any residual pressure in the power chamber 26 sufficient to cause dragging of the brakes of the vehicle will free the sticking control spool 56 to permit full release of the brakes of the vehicle.

In a second embodiment shown in FIG. 3, an alternative arrangement is provided for hydraulically connecting the power chamber 26 to the return line 14 of the system in the event the control spool 56 sticks in a position closing fluid communication therebetween. FIG. 3 illustrates a system identical to that shown in FIGS. 1 and 2 except that the groove 46 and land 47 of the first embodiment are replaced with a groove 146 and a land 147 constructed and arranged as shown in FIG. 3 so that the groove 146 hydraulically connects the trapped volume chamber 30 to the passage 45 and return line 14, while the land 147 in the deactuated position hydraulically connects the power chamber 26 to the passage 45 and return line 14. In this second embodiment shown in FIG. 3, both the trapped volume chamber 30 and the power chamber 26 are connected directly to the return line 14 independently of the position of the control spool 56 to insure a full brake release even if the spool 56 sticks near the end of a brake release.

In the event the pump 11 is not operating, whether by failure of the pump 11 or stalling of the engine of the vehicle or loss of fluid from the system or any other reason, the ratio override valve 17 releases the pressure in the trapped volume chamber 30. This is because the light biasing spring of the ratio override valve 17 moves the piston 70 to the leftward position shown in FIG. 1 to connect the trapped volume chamber 30 to the inlet side reservoir of the pump 11 through the passages 73 and 72, and through the return line 14. When this occurs, actuation of the brake pedal 33 causes the input rod 31 to move to the left until its abutment surface 41 mechanically engages the right end face of the output rod 38. Further movement of the input rod 31 to the left moves the output rod 38 and power piston 25 to the left to manually and without power assist actuate the brakes of the vehicle. In this manner, the ratio override valve 17 eliminates the hydraulic ratio between the movement of the input rod 31 and the output rod 38 so that a one to one ratio of such movement is established. By eliminating the hydraulic ratio, a greater mechanical advantage between the brake pedal 33 and the master cylinder actuating rod 24 is provided for manual actuation of the brakes.

What is claimed is:

1. In a motor vehicle, a fluid power circuit comprising a pump having an inlet side and an outlet side, a control valve, a steering valve having an inlet side and an outlet side, a brake booster, and conduit means hydraulically connecting said pump and control valve and steering valve and brake booster; said control valve including a control spool slidably disposed in a bore and having opposite end faces, valve means on said control spool controlling fluid pressure communication between said pump outlet side and said brake booster and between said pump outlet side and said steering valve inlet side; said brake booster including a housing having a bore extending therethrough, a power piston slidably disposed in said bore, a power chamber in said bore on one side of said power piston, a trapped volume chamber in said bore, an output rod on said one side of said power piston extending into said trapped volume chamber and having a predetermined lateral cross-sectional area exposed to the fluid pressure level in said trapped volume chamber, an input rod slidably disposed for movement to and from a deactuated position in said bore and extending into said trapped volume chamber, said input rod having a predetermined lateral cross-sectional area exposed to the fluid pressure level in said trapped volume chamber, said input rod area being substantially greater than said output rod area and being constructed and arranged such that movement of said input rod in said trapped volume chamber results in proportional but larger movement of said output rod when the volume of fluid in said trapped volume chamber remains substantially constant, a brake pedal operatively connected to said input rod for moving said input rod in said trapped volume chamber, a passage in said brake booster, said conduit means including means establishing open fluid pressure communication between said passage and said outlet side of said steering valve under all conditions, said passage opening into said bore at a predetermined location, and said input rod including valving surface means constructed and arranged to block said passage when said input rod is actuated and to establish open fluid pressure communication between said passage and said trapped volume chamber when said input rod is deactuated.

2. A motor vehicle fluid power circuit as defined in claim 1 wherein said brake booster includes a connecting portion extending between said power chamber and said trapped volume chamber, and said predetermined location is in said connecting portion of said bore.

3. A motor vehicle fluid power circuit as defined in claim 1 wherein said brake booster further includes other valving surface means constructed and arranged to establish open fluid pressure communication between said passage and said power chamber when said input rod is deactuated.

4. A motor vehicle fluid power circuit as defined in claim 1 including fluid flow restricting means downstream of said steering valve outlet side maintaining the fluid pressure level of said steering valve outlet side and of said trapped volume chamber at at least three p.s.i. gauge pressure and no greater than ten p.s.i. gauge pressure when said input rod is deactuated, whereby the size of any air bubbled trapped in said trapped volume chamber is substantially reduced to minimize delay in building pressure in said trapped volume chamber.

5. A motor vehicle fluid power circuit as defined in claim 4 wherein said fluid flow restricting means maintains said fluid pressure level of said steering valve outlet side and of said trapped volume chamber at at least five p.s.i. gauge pressure and no greater than eight p.s.i. gauge pressure when said input rod is deactuated.

6. In a motor vehicle, a fluid power circuit comprising a pump having an inlet side and an outlet side, a control valve, a steering valve having an inlet side and an outlet side, a brake booster, and conduit means hydraulically connecting said pump and control valve and steering valve and brake booster; said brake booster including a housing having a bore extending therethrough, a power piston slidably disposed in said bore, a power chamber in said bore on one side of said power piston, a trapped volume chamber in said bore, an output rod on said one side of said power piston extending into said trapped volume chamber and having a predetermined lateral cross-sectional area exposed to the fluid pressure level in said trapped volume chamber, an input rod slidably disposed for movement to and from a deactuated position in said bore and extending into said trapped volume chamber, said input rod having a predetermined lateral cross-sectional area exposed to the fluid pressure level in said trapped volume chamber, said input rod area being substantially greater than said output rod area and being constructed and arranged such that movement of said input rod in said trapped volume chamber results in proportional but larger movement of said output rod when the volume of fluid in said trapped volume chamber remains substantially constant, and a brake pedal operatively connected to said input rod for moving said input rod in said trapped volume chamber; said control valve including a control spool slidably disposed in a bore and having opposite end faces, conduit means hydraulically connecting one of said end faces to the fluid pressure in said power chamber and the other of said end faces to the fluid pressure in said trapped volume chamber, first valving surface means carried by said control spool controlling fluid pressure communication between said pump outlet side and said brake booster power chamber, second valving surface means carried by said control spool metering fluid flow from said pump to said steering valve, third valving surface means carried by said control spool controlling fluid pressure communication between said fluid power chamber and said steering valve outlet side, said control spool being constructed and arranged so that said trapped volume chamber pressure acting on said other end of said control spool urges said control spool in a direction to open said first valving surface means and to restrict said second valving surface means and to close said third valving surface means, said control spool being further constructed and arranged so that fluid power chamber pressure acting on said one end of said control spool urges said control spool in a direction to close said first valving surface means and to open said second valving surface means and to open said third valving surface means, and said brake booster further including valving surface means separate from said control spool and operatively associated with said input rod establishing direct fluid pressure communication between said trapped volume chamber and said steering valve outlet side independently of said third valving surface means of said control spool when said input rod is in said deactuated position so that said trapped volume chamber is hydraulically connected to said steering valve outlet side even if said control spool sticks in its associated bore in a position in which said third valving surface means of said control spool is closed.

7. A motor vehicle fluid power circuit as defined in claim 6 including a passage in said brake booster, said conduit means including means establishing open fluid pressure communication between said passage and said steering valve outlet side under all conditions, said passage opens into said bore in said brake booster, and said valving surface means carried by said input rod is constructed and arranged to block said passage when said input rod is actuated and to open said passage when said input rod is deactuated.

8. A motor vehicle fluid power circuit as defined in claim 7 wherein said bore in said brake booster includes a connecting portion extending between said power chamber and said trapped volume chamber, and said passage opens into said connecting portion of said bore.

9. A motor vehicle fluid power circuit as defined in claim 8 wherein said brake booster further includes other valving surface means separate from said control spool carried by said input rod establishing direct fluid pressure communication between said fluid power chamber and said steering valve outlet side independently of said control spool when said input rod is in said deactuated position so that said fluid power chamber is hydraulically connected to said steering valve outlet side even if said control spool sticks in its associated bore in a position in which said third valving surface means of said control spool is closed, said first mentioned and said other valving surface means are slidably disposed in said connecting portion of said bore, said first mentioned valving surface means includes an annular groove on the exterior surface of said input rod, said other valving surface means includes a land on the exterior surface of said input rod adjacent said groove, said groove establishes fluid pressure communication between said trapped volume chamber and said passage when said input rod is in said deactuated position, and said land is disposed adjacent said passage to establish fluid pressure communication between said power chamber and said passage when said input rod is in said deactuated position.

10. A motor vehicle fluid power circuit as defined in claim 6 wherein said brake booster further includes other valving surface means separate from said control spool carried by said input rod establishing direct fluid pressure communication between said fluid power chamber and said steering valve outlet side independently of said control spool when said input rod is in said deactuated position so that said fluid power chamber is hydraulically connected to said steering valve outlet side even if said control spool sticks in its associated bore in a position in which said third valving surface means of said control spool is closed.

11. A motor vehicle fluid power circuit as defined in claim 6 including fluid flow restricting means downstream of said steering valve outlet side maintaining the fluid pressure level of said steering valve outlet side and of said trapped volume chamber at least three p.s.i. gauge pressure and no greater than ten p.s.i. gauge pressure when said input rod is deactuated, whereby the size of any air bubbles trapped in said trapped volume chamber is substantially reduced to minimize delay in building pressure in said trapped volume chamber.

12. A motor vehicle fluid power circuit as defined in claim 11 wherein said fluid flow restricting means maintains said fluid pressure level of said steering valve outlet side and of said trapped volume chamber at at least five p.s.i. gauge pressure and no greater than eight p.s.i. gauge pressure when said input rod is deactuated.

13. A motor vehicle fluid power circuit as defined in claim 6 including second conduit means hydraulically connecting said trapped volume chamber to said outlet side of said steering valve, a ratio override valve in said second conduit means isolating said trapped volume chamber from said outlet side of said steering valve under all normal operating conditions when said pump is operating and establishing open fluid pressure communication between said trapped volume chamber and said outlet side of said steering valve in response to a fluid pressure failure in said pump, said ratio override valve including a piston, said piston having a first predetermined lateral cross-sectional area exposed to the fluid pressure upstream of said steering valve acting in a direction to close said ratio override valve and a second predetermined lateral cross-sectional area exposed to said fluid pressure of said trapped volume chamber acting in a direction to open said ratio override valve, and said second area being on the order of one-tenth said first area whereby said fluid pressure upstream of said steering valve maintains said ratio override valve closed even in the event of a sudden spike increase in pressure in said trapped volume chamber.

14. In a motor vehicle, a fluid power circuit comprising a pump having an inlet side and an outlet side, a control valve, a steering valve having an inlet side and an outlet side, a brake booster, flow restricting means, and conduit means hydraulically connecting said pump and control valve and steering valve and brake booster and flow restricting means; said control valve including a control spool slidably disposed in a bore and having opposite end faces, valve means on said control spool controlling fluid pressure communication between said pump outlet side and said brake booster and between said pump outlet side and said steering valve inlet side; said brake booster including a housing having a bore extending therethrough, a power piston slidably disposed in said bore, a power chamber in said bore on one side of said power piston, a trapped volume chamber in said bore, an output rod on said one side of said power piston extending into said trapped volume chamber and having a predetermined lateral cross-sectional area exposed to the fluid pressure level in said trapped volume chamber, an input rod slidably disposed for movement to and from a deactuated position in said bore and extending into said trapped volume chamber, said input rod having a predetermined lateral cross-sectional area exposed to the fluid pressure level in said trapped volume chamber, said input rod area being substantially greater than said output rod area and being arranged such that movement of said input rod in said trapped volume chamber results in proportional but larger movement of said output rod when the volume of fluid in said trapped volume chamber remains substantially constant, and a brake pedal operatively connected to said input rod for moving said input rod in said trapped volume chamber; said flow restricting means being disposed upstream of said pump inlet side, said flow restricting means being constructed and arranged to maintain the fluid pressure level of said trapped volume chamber at at least three p.s.i. gauge pressure and no greater than ten p.s.i. gauge pressure when said input rod is deactuated, whereby the size of any air bubbles trapped in said trapped volume chamber is substantially reduced to minimize delay in building pressure in said trapped volume chamber.

15. A motor vehicle fluid power circuit as defined in claim 14 wherein said flow restricting means maintains said fluid pressure level of said trapped volume chamber at at least five p.s.i. gauge pressure and no greater than eight p.s.i. gauge pressure when said input rod is deactuated.

16. A motor vehicle fluid power circuit as defined in claim 14 including passage means maintaining open fluid pressure communication between said steering valve outlet side and said trapped volume chamber when said input rod is in said deactuated position.

17. In a motor vehicle, a fluid power circuit comprising a pump having an inlet side and an outlet side, a control valve, a steering valve having an inlet side and an outlet side, a brake booster, a ratio override valve, and conduit means hydraulically connecting said pump and control valve and steering valve and brake booster and ratio override valve; said control valve including a control spool slidably disposed in a bore and having opposite end faces, valve means on said control spool controlling fluid pressure communication between said pump outlet side and said brake booster and between said pump outlet side and said steering valve inlet side; said brake booster including a housing having a bore extending therethrough, a power piston slidably disposed in said bore, a power chamber in said bore on one side of said power piston, a trapped volume chamber in said bore, an output rod on said one side of said power piston extending into said trapped volume chamber and having a predetermined lateral cross-sectional area exposed to the fluid pressure level in said trapped volume chamber, an input rod slidably disposed for trapped volume chamber, an input rod slidably disposed for movement to and from a deactuated position in said bore and extending into said trapped volume chamber, said input rod having a predetermined lateral cross-sectional area exposed to the fluid pressure level in said trapped volume chamber, said input rod area being substantially greater than said output rod area and being constructed and arranged such that movement of said input rod in said trapped volume chamber results in proportional but larger movement of said output rod when the volume of fluid in said trapped volume chamber remains substantially constant, and a brake pedal operatively connected to said input rod for moving said input rod in said trapped volume chamber; said ratio override valve being disposed in a portion of said conduit means which hydraulically connects said trapped volume chamber of said brake booster to said outlet side of said steering valve, said ratio override valve being constructed and arranged to close said portion of said conduit means to isolate said trapped volume chamber from said outlet side of said steering valve under all normal operating conditions when said pump is operating and to open said portion of said conduit means to establish open fluid pressure communication between said trapped volume chamber and said outlet side of said steering valve in response to a fluid pressure failure in said pump, said ratio override valve including a piston, said piston having a first predetermined lateral cross-sectional area exposed to the fluid pressure upstream of said steering valve acting in a direction to close said ratio override valve and a second predetermined lateral cross-sectional area exposed to said fluid pressure of said trapped volume chamber acting in a direction to open said ratio override valve, and said second area being substantially smaller than said first area whereby said fluid pressure upstream of said steering valve maintains said ratio override valve closed even in the event of a sudden spike increase in pressure in said trapped volume chamber.

18. A motor vehicle fluid power circuit as defined in claim 17 wherein said second area is on the order of one-tenth said first area, a spring acts against said piston, and said spring is constructed and arranged to urge said piston in a direction to open said portion of said conduit means to establish said open fluid pressure communication between said trapped volume chamber and said outlet side of said steering valve.

19. A motor vehicle fluid power circuit as defined in claim 18 wherein said piston is a dual diameter piston having a larger diameter portion and a smaller diameter portion slidably disposed in a stepped bore; said large diameter portion includes a larger diameter end face and said smaller diameter portion includes a smaller diameter end face, said first area is said larger diameter end face, said second area is said smaller diameter end face, and a seal cooperates with said smaller diameter portion to close said portion of said conduit means to isolate said trapped volume chamber from said outlet side of said steering valve under all normal operating conditions when said pump is operating and to open said portion of said conduit means to establish open fluid pressure communication between said trapped volume chamber and said outlet side of said steering valve in response to a fluid pressure failure in said pump.

* * * * *